US006302371B1

(12) United States Patent
Reiter

(10) Patent No.: US 6,302,371 B1
(45) Date of Patent: Oct. 16, 2001

(54) ELECTROMAGNETICALLY ACTUATABLE VALVE

(75) Inventor: Ferdinand Reiter, Markgröningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,162

(22) PCT Filed: May 3, 1999

(86) PCT No.: PCT/DE99/01286

§ 371 Date: May 30, 2000

§ 102(e) Date: May 30, 2000

(87) PCT Pub. No.: WO00/06893

PCT Pub. Date: Feb. 10, 2000

(30) Foreign Application Priority Data

Jul. 24, 1998 (DE) .............................................. 198 33 461

(51) Int. Cl.[7] ...................................................... F16K 31/02
(52) U.S. Cl. ........................................................ 251/129.21
(58) Field of Search ......................... 251/129.15, 129.18, 251/129.21

(56) References Cited

U.S. PATENT DOCUMENTS 3,582,039 * 6/1971 Cagle .................................. 251/129
4,264,040 4/1981 Saito .
4,423,841 * 1/1984 Palma .................................. 251/141
4,423,843 1/1984 Palma .
4,666,087 5/1987 Jaggle et al. .
4,786,030 11/1988 Greiner et al. .
4,946,103 * 8/1990 Ganser ............................ 251/129.15
5,820,031 * 10/1998 Reiter et al. .................... 251/129.21
5,875,975 * 3/1999 Reiter et al. .................... 251/129.21
5,992,822 * 11/1999 Nakao et al. .................. 251/129.15

FOREIGN PATENT DOCUMENTS 32 30 844 A 2/1984 (DE) .
38 10 826 A 10/1989 (DE) .
44 21 935 A 6/1995 (DE) .
0 009 388 A 4/1980 (EP) .
2 196 181 A 4/1988 (GB) .

* cited by examiner

*Primary Examiner*—Kevin Shaver
*Assistant Examiner*—D. Austin Bonderer
(74) *Attorney, Agent, or Firm*—Kenyon & Kenyon

(57) ABSTRACT

An electromagnetically actuatable valve includes a core and an armature, each having a respective end face. The end faces are aligned and opposing. One of the end faces has a spherically-curved contour, and the other of the end faces defines a conical surface with respect to a longitudinal axis of the valve. At least one of the end faces may include a wear-resistant coating. At least one of the end faces may be surface-hardened.

14 Claims, 3 Drawing Sheets

ELECTROMAGNETICALLY ACTUATABLE VALVE

BACKGROUND INFORMATION

The present invention relates to an electromagnetically actuatable valve.

Various electromagnetically actuatable valves are known, in particular fuel injectors, in which parts that are subject to wear are provided with a wear-resistant coating. Thus, for example, it is known from German Published Patent application No. 32 30 844 to provide the armature and stop face of a fuel injector with wear-resistant surfaces. These surfaces can be nickel-plated, i.e. provided with an additional coating, or nitrided, i.e. cured through the application of nitrogen.

In German Published Patent application No. 38 10 826, a fuel injector is described in which at least one stop face is executed in the shape of a spherical cup, in order to obtain the most precise possible air gap, an additional round-body insert made of non-magnetic, high-strength material being mounted centrally on the stop face. The two spherical-cup-shaped stop faces contact each other precisely in the center in the area of the valve longitudinal axis.

From German Published Patent application No. 44 21 935, an electromagnetically actuatable valve is described, which has a special stop area. The valve has at least one component, the armature and/or the core, that has a wedge-like surface before a wear-resistant layer has been applied, the surface being able to be produced in each case differently in accordance with a magnetic and hydraulic optimum. An annular stop segment formed by the wedge quality has a defined stop surface width and contact width, which remains constant over the entire service life, since in response to continuous operation, stop surface wear does not lead to an enlargement of the contact width.

SUMMARY OF THE INVENTION

The electromagnetically actuatable valve according to the present invention has the advantage that one of the components that strike against each other, armature and core, is configured such that it is assured, after producing a wear-resistant surface, that the stop surface is not undesirably enlarged due to wear even after long periods of operation, so that the operating and decay times of the movable component remain virtually constant. This is achieved due to the fact that one of the components striking against the other already has a spherically curved surface before the generation of the wear-resistance.

The components configured in this manner have the advantage of improved long-term durability, since the stop is in the area of an annular contact line in the center of the surface and not on the easily-damaged edges.

The simple geometry of the spherically curved end face is easy to manufacture and to check.

It is particularly advantageous, due to the very small manufacturing expense, to configure the spherical curvature of the end face as a spherical segment or a spherical cup segment.

It is advantageous to fixedly join the armature to a valve needle that is axially movable along the valve longitudinal axis, to arrange a valve-closure member at the opposite end, the valve-closure member being spherically shaped, and to place the center point, for the formation of the spherical-segment-shaped contour of the end face on the armature at the distance of the desired radius, in the center point of the valve-closure member. Even in the event of a large so-called radial deviation of the valve-closure member with respect to the armature, there exists a quite high tolerance-insensitivity of the stop proportions.

Using this configuration of the stop area, a good hydraulic stop damping capacity is achieved, because due to the relatively large radius narrow compression gaps of <10 $\mu$m are formed.

DETAILED DESCRIPTION

Figure 1:
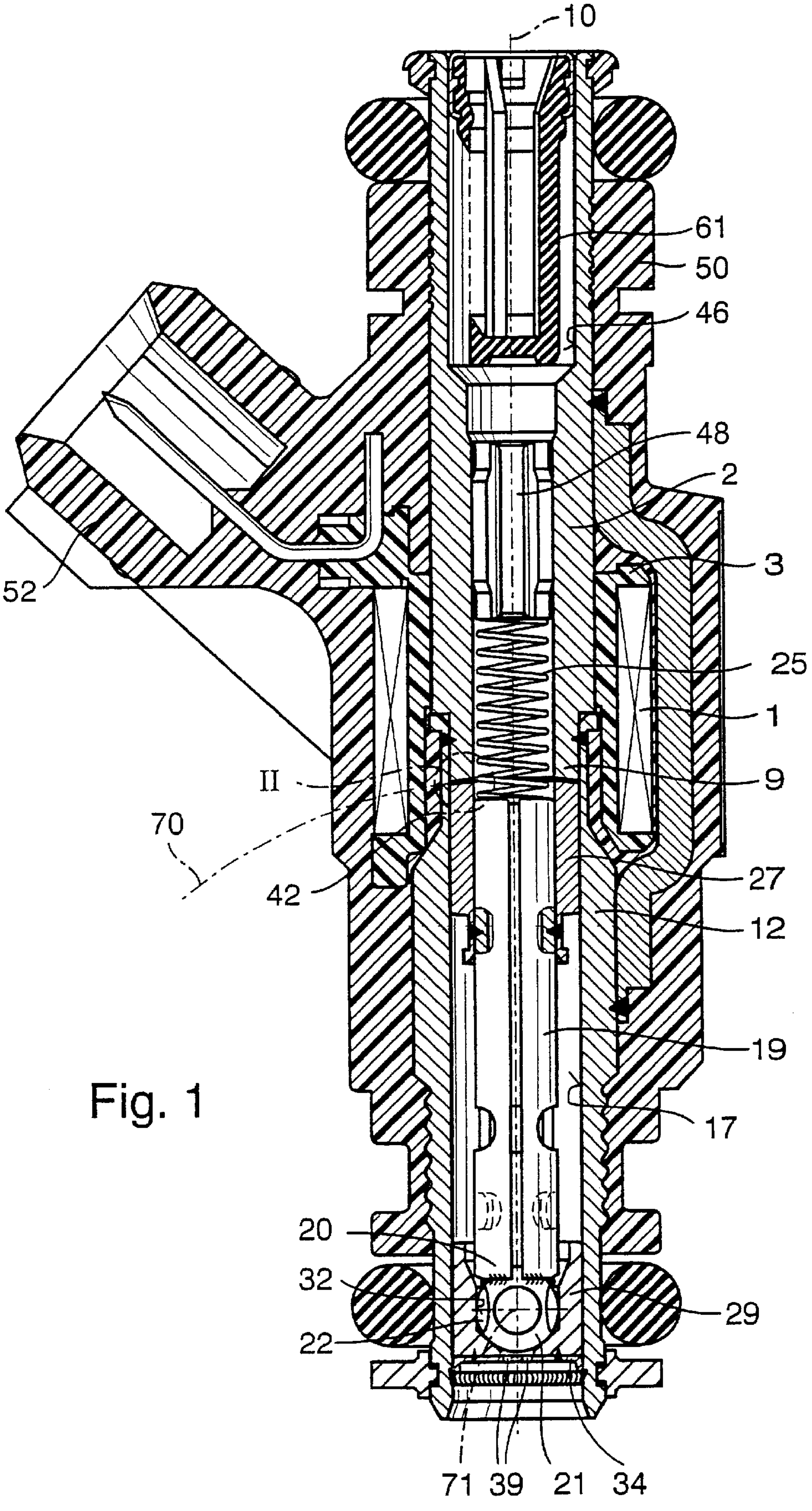
FIG. 1 shows an electromagnetically actuatable valve of the present invention embodied in the form of a fuel injector.

The electromagnetically actuatable valve of the present invention is depicted by way of example in FIG. 1 in the form of an injector for fuel injection systems of mixture-compressing, spark-ignition internal combustion engines. The valve has a core 2 that is surrounded by a solenoid coil 1 and that functions as a fuel intake pipe, core 2 being configured, by way of example, so as to be tube-shaped. A coil body 3 receives a winding of solenoid coil 1 and in connection with core 2 makes possible a particularly compact design of the injector in the area of solenoid coil 1.

A tubular metallic valve-seat support 12 is joined, for example by welding, to a lower core end 9 of core 2 in a concentric manner, and it partially surrounds core end 9. In valve-seat support 12 a longitudinal bore hole 17 runs, which is configured to be concentric with respect to valve longitudinal axis 10. A valve needle 19, which may be tubular, for example, is arranged in longitudinal bore hole 17. A spherical valve-closure member 21 is joined to the downstream end 20 of the valve needle 19 by, for example, welding. Five flattened-off areas 22 are provided, for example, around the periphery of valve-closure member 21 to permit the fuel to flow past.

The actuation of the injector takes place electromagnetically in a familiar manner. The electromagnetic circuit, inter alia, having solenoid coil 1, core 2, and armature 27 functions to accomplish the axial motion of valve needle 19 and therefore to open, in opposition to the spring tension of a resetting spring 25, and to close the injection valve. Armature 27 is fixedly joined to the end of valve needle 19 that is facing away from valve-closure member 21 and is aligned with core 2. A cylindrical valve-seat body 29, having a stationary valve seat, is tightly mounted in longitudinal bore hole 17, for example by welding, in the end of valve-seat support 12 that is facing away from core 2 and is situated downstream.

A guide hole 32 of valve-seat body 29 functions to guide valve-closure member 21 during its axial motion along valve longitudinal axis 10. On the other hand, armature 27, as a part of the axially movable valve needle 19 in the area of a thin-wall magnetic restricter 42, is guided in longitudinal bore hole 17 of valve-seat support 12. Spherical valve-closure member 21 cooperates with the valve seat of valve-seat body 29 tapering in the direction of the flow in a truncated-cone shape. At its end face facing-away from valve-closure member 21, valve-seat body 29 is fixedly joined to an, a, for example, pot-shaped spray-orifice plate 34 in a concentric manner, the spray-orifice plate having, for example, four spray-discharge orifices 39 formed through eroding or stamping.

The insertion depth of valve-seat body 29 having pot-shaped spray-discharge plate 34 determines the setting of the stroke of valve needle 19. In this context, the one end position of valve needle 19, when solenoid coil 1 is not excited, is determined by the position of valve-closure member 21 at the valve seat of valve-seat body 29, whereas the other end position of valve needle 19, when solenoid coil 1 is excited, is generated by the position of armature 27 at core end 9. This stop area according to the present invention is designated in greater detail by a circle and in FIG. 2 is once again depicted in an altered scale.

An adjusting sleeve 48, that is inserted into flow bore hole 46 running concentrically with respect to valve longitudinal axis 10, functions to set the resilience of resetting spring 25 situated at adjusting sleeve 48, resetting spring 25 being in turn supported on valve needle 19 at its opposite side.

The injector is substantially surrounded by a plastic extrusion coat 50, which extends from core 2, proceeding in the axial direction over solenoid coil 1, to valve-seat support 12. Belonging to this plastic extrusion coat 50 is, for example, a similarly extruded electrical plug connector 52.

A fuel filter 61 extends into flow bore hole 46 of core 2 at its intake side and functions to filter out those fuel components that could cause blockages or damage in the injection valve due to their size.

According to the present invention, one of the two end faces opposite each other of core 2 and of armature 27 in the stop area is spherically curved, in particular ball-like, sphere-segment-shaped or calotte-segment-shaped, with finally an end face forming an annular spherical segment as a result of the annular configuration of core 2 and armature 27. Using a dash-dot line 70 in FIG. 1, a radius is depicted as a circular segment, in order to make clear this convex curvature. In an ideal manner, center point 71 of a (imagined) sphere provided with radius R (FIG. 2) is situated in the center point of spherical valve-closure member 21, i.e., at the location at which valve longitudinal axis 10 intersects the plane of the sphere equator of valve-closure member 21.

Figure 2:
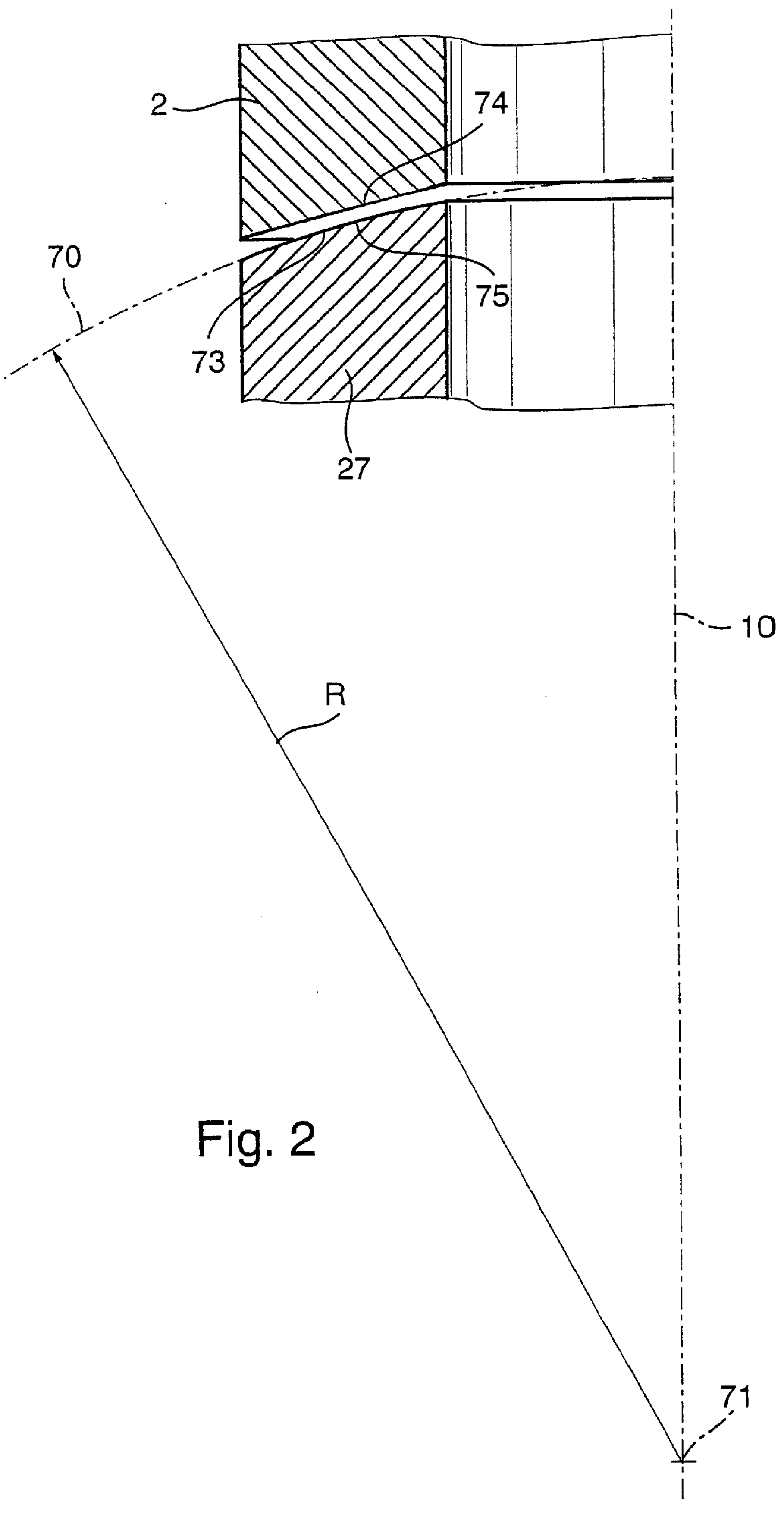
FIG. 2 shows an enlarged stop area of the injector in the area of a core and an armature of the valve illustrated in FIG. 1.

In FIG. 2, the stop area designated in FIG. 1 by a circle is once again depicted enlarged. Upper end face 73 of armature 27 facing core 2, in this context, is shaped so as to be convex curved, spherical, and to have a constant radius. In contrast, lower end face 74 of core 2 facing armature 27 is executed in a planar fashion and obliquely inclined with respect to valve longitudinal axis 10. Thus, the lower end face 74 defines a conical surface. The inclination of end face 74, in this context, is selected such that end face 74 at a desired contact point 75 of armature 27 (only the drawing plane being viewed) and at a desired annular contact line 75 of armature 27 (viewed as a real three-dimensional component) runs tangentially with respect to the sphere surface. As was already described, center point 71 of an (imagined) sphere provided with radius R for sphere-segment-shaped end face 73 of armature 27 that is to be formed is advantageously situated at the center point of spherical valve-closure member 21. Using this configuration of the stop area according to the invention, a good hydraulic stop damping capacity is achieved, since as a result of the relatively large radius R (for the valve depicted in FIG. 1, R is approximately 24 mm) narrow compression gaps of $<10$ $\mu$m are formed.

However, in addition to the exemplary embodiment depicted in FIG. 2, it is also possible to shift center point 71 for the (imagined) sphere in both directions on valve longitudinal axis 10 in order to achieve sphere-segment-shaped end face 73 of armature 27, so that sphere-segment-shaped end face 73 has a smaller or larger radius than radius R according to FIG. 2. However, the rotational center point should advantageously be located on valve longitudinal axis 10, in order to achieve a unified curvature of end face 73 over its entire annular dimension.

Figure 3:
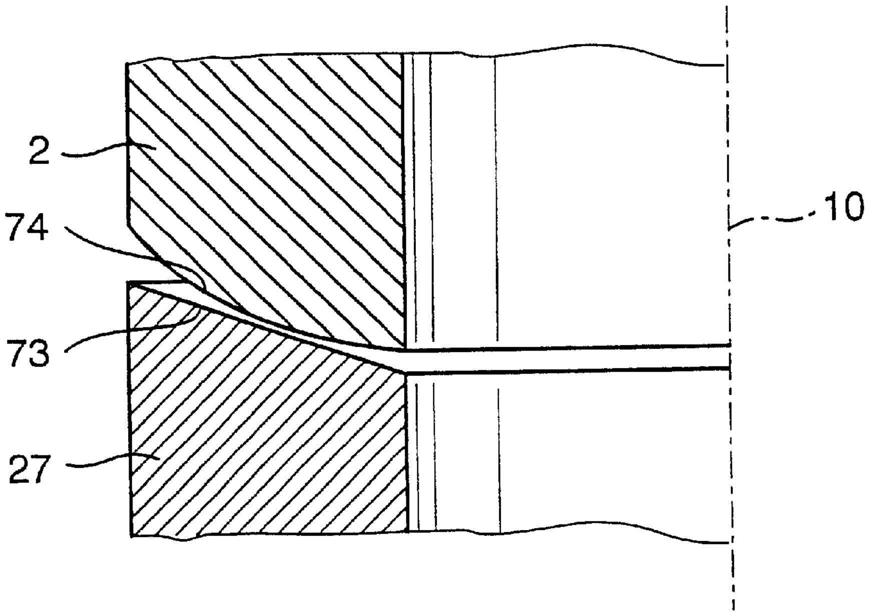
FIG. 3 shows a second example of the stop area.
Figure 4:
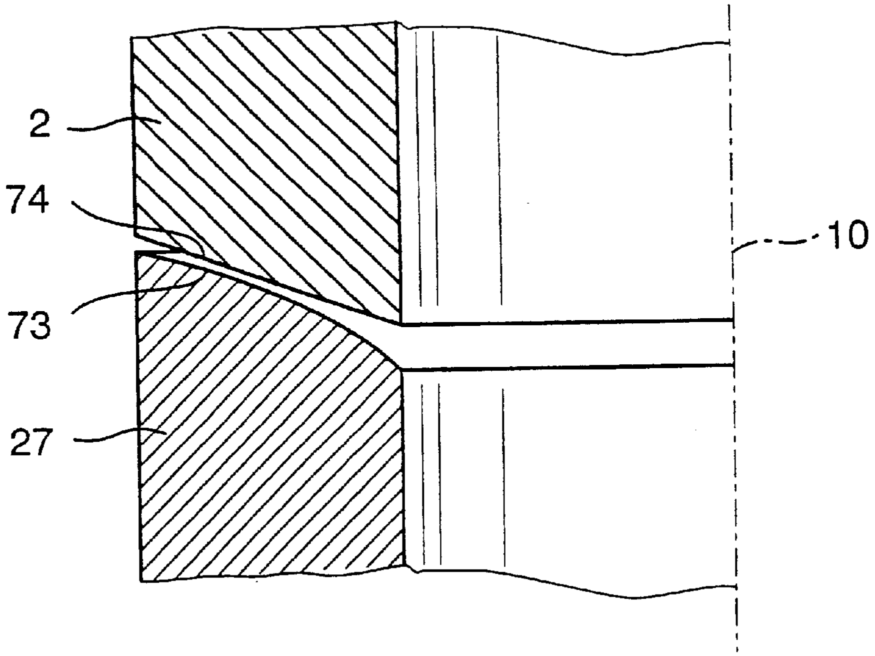
FIG. 4 shows a third example of the stop area.

In FIGS. 3 and 4, two further examples of stop areas configured according to the invention are depicted. In this context, in the exemplary embodiment according to FIG. 3, only end faces 73, 74 are reversed with respect to the arrangement according to FIG. 2. Lower end face 74 of core 2 is therefore configured so as to be curved in a sphere-segment-shaped manner, whereas upper end face 73 of armature 27 runs in a planar fashion and is obliquely inclined with respect to valve longitudinal axis 10. Center point 71 of the (imagined) sphere, in this context, is located far above core end 9 on valve longitudinal axis 10.

FIG. 4 depicts an example which is rather more difficult to manufacture from the production engineering standpoint, in which not only one center point 71 of an (imagined) sphere exists to generate the curved sphere-segment-shaped end face 73 of armature 27. Rather, there exists a multiplicity of rotational points away from valve longitudinal axis 10 and even outside the circumference of armature 27, in order to achieve a uniform curvature across entire end face 73 in the peripheral direction.

All of the exemplary embodiments have the advantage of improved long-term durability, since the stop (contact line 75) is in the center of the surface and not on the easily-damaged edges.

On end faces 73, 74, for example, additional thin metallic coatings, such as, for example, nickel coatings, are applied by electroplating. These coatings are particularly wear-resistant and reduce a hydraulic adhesion of the contacting surfaces.

In addition, end faces 73, 74 can be made wear-resistant at least partly in the center area using a treatment of the surface by a hardening process. Suitable as hardening processes for this purpose are, for example, the known nitride processes such as plasma nitriding or gas nitriding or carbureting. By using hardening processes, as a result of which the surface structure on armature 27 and/or core 2 is altered, it is even possible entirely to do without processes for a direct coating.

What is claimed is:

1. An electromagnetically actuatable valve, comprising:

a core made of a ferromagnetic material and having a core end face serving as a stop and a valve longitudinal axis;

a solenoid coil;

a valve-closure member;

a stationary valve seat; and an armature having an armature end face and being actuated by the valve-closure member cooperating with the stationary valve seat, wherein:

the armature is pulled toward the core end face when the solenoid coil is excited, the core end face and the armature end face oppose each other in an aligned arrangement, and one of the core end face and the armature end face has a spherically curved contour extending in a peripheral direction according to a constant, annular arrangement.

2. The valve according to claim 1, wherein the valve corresponds to a fuel injector for a fuel injection system in an internal combustion engine.

3. The valve according to claim 1, wherein:

the core end face is sphere-segment shaped, and the armature end face runs according to a planar configuration and is obliquely inclined with respect to the valve longitudinal axis.

4. The valve according to claim 3, wherein:

the sphere-segment-shaped core end face has an annular contact line, and the armature end face, when in a resting state, runs tangentially to the annular contact line.

5. The valve according to claim 3, wherein:

a sphere-segment-shaped contour of the sphere-segment-shaped core end face has a constant radius R.

6. The valve according to claim 5, wherein:

for a formation of the sphere-segment-shaped contour, a center point is located on the valve longitudinal axis at a distance of radius R.

7. The valve according to claim 6, further comprising:

a valve needle having one end fixedly joined to the armature and being axially movable along the valve longitudinal axis, wherein:

the valve-closure member is spherically-shaped and arranged at another end of the valve needle opposite the armature, and for the formation of the sphere-segment-shaped contour, the center point is located in a center point of the valve-closure member at the distance of radius R.

8. The valve according to claim 1, wherein:

the armature end face is sphere-segment shaped, and the core end face runs according to a planar configuration end is obliquely inclined with respect to the valve longitudinal axis.

9. The valve according to claim 8, wherein:

the sphere-segment-shaped armature end face has an annular contact line, and the core end face, when in a resting state, runs tangentially to the annular contact line.

10. The valve according to claim 8, wherein:

a sphere-segment-shaped contour of the sphere-segment-shaped armature and face has a constant radius R.

11. The valve according to claim 10, wherein:

for a formation of the sphere-segment-shaped contour, a center point is located on the valve longitudinal axis at a distance R.

12. The valve according to claim 11, further comprising:

a valve needle having one end, fixedly joined to the armature and being axially movable along the valve longitudinal axis, wherein:

the valve-closure member is spherically-shaped and arranged at another end of the valve needle opposite the armature, and for the formation of the sphere-segment-shaped contour, the center point is located in a center point of the valve-closure member at the distance of radius R.

13. The valve according to claim 1, wherein at least one of the core and the armature is coated in an area of a respective one of the core end face and the armature end face.

14. The valve according to claim 1, wherein at least one of the core and the armature is treated in an area of a respective one of the core end face and the armature end face using a hardening process.

* * * * *